Feb. 20, 1934.  F. R. McMURRAY  1,948,274
PIPE JOINT SEALING DEVICE
Filed Nov. 14, 1932  2 Sheets-Sheet 1
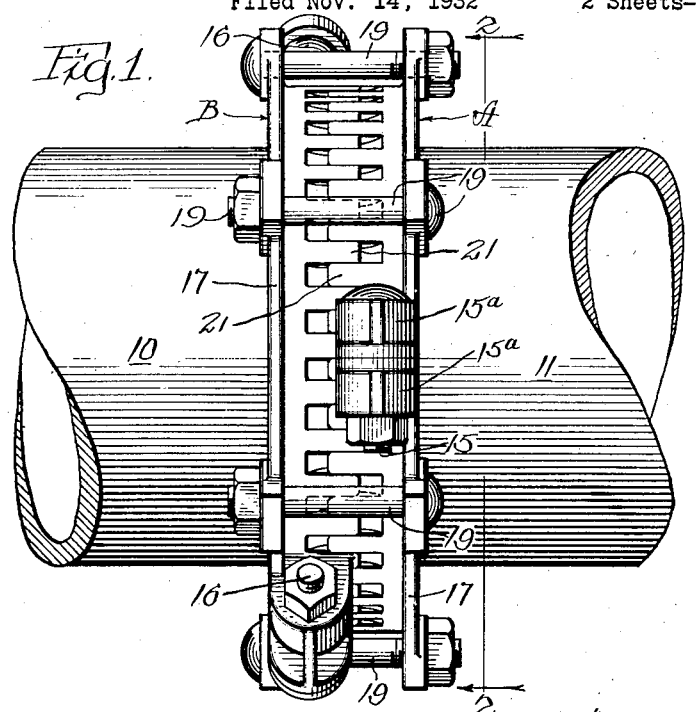
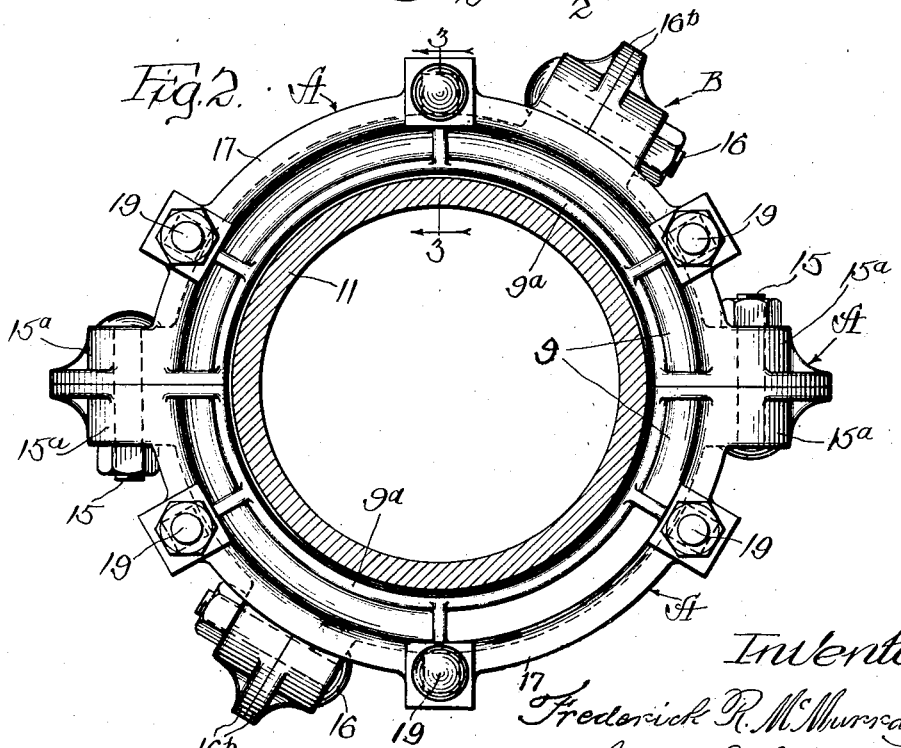
Inventor:
Frederick R. McMurray
By Luther Johns
Atty.

Feb. 20, 1934.  F. R. McMURRAY  1,948,274
PIPE JOINT SEALING DEVICE
Filed Nov. 14, 1932  2 Sheets-Sheet 2
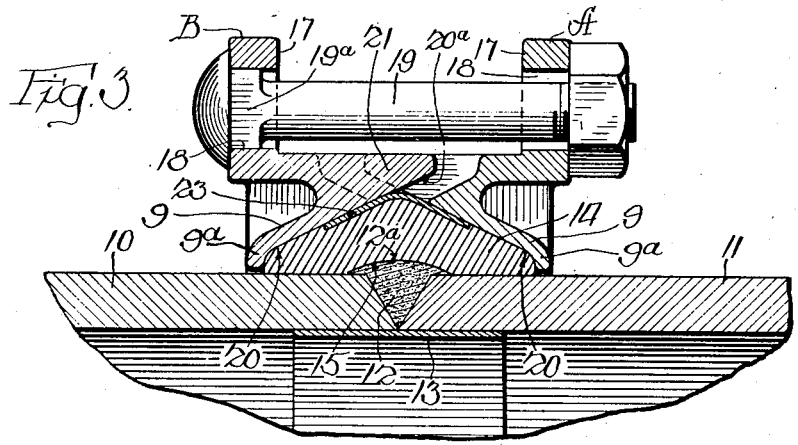
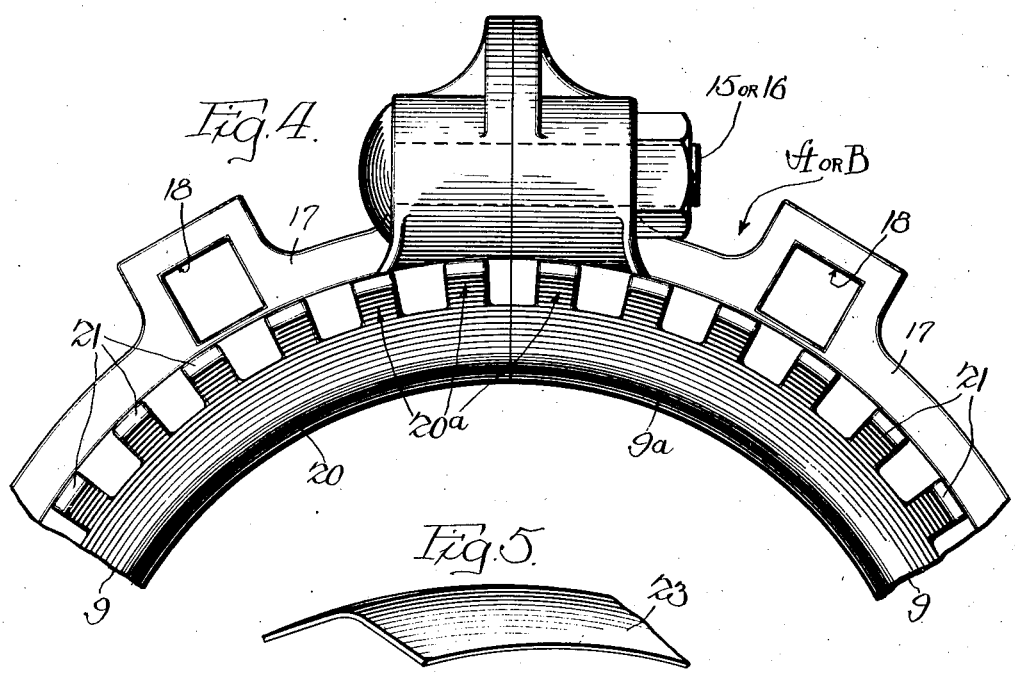
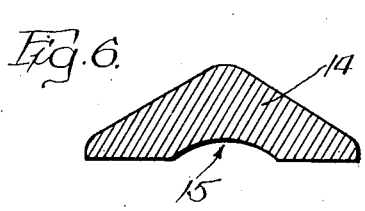
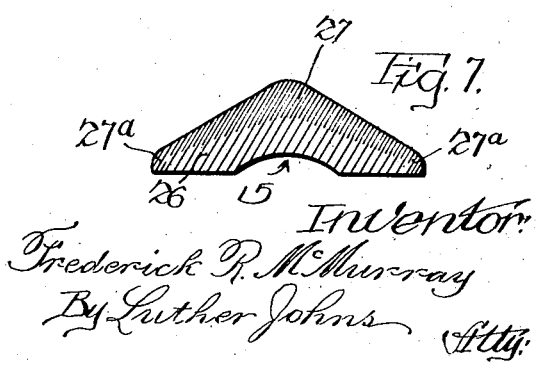

Patented Feb. 20, 1934

1,948,274

UNITED STATES PATENT OFFICE 1,948,274

PIPE JOINT SEALING DEVICE

Frederick R. McMurray, South Bend, Ind., assignor to M. B. Skinner Co., South Bend, Ind., a corporation of Indiana Application November 14, 1932
Serial No. 642,579

7 Claims. (Cl. 285—132)

This invention relates to pipe sealing devices ordinarily called pipe clamps.

The invention is designed for use particularly with wrought iron or steel pipes having annular welded joints, as for example in mains commonly used for conducting gas and oil from the oil fields. The joints of such mains are difficultly welded and are frequently leaky initially. The longitudinal and circumferential expansion and contraction of the pipes due to changes in weather conditions cause these welded joints to develop cracks and fissures. It has been common practice to re-weld the joints, sometimes every several years throughout many miles of the main, at great expense. It also has been suggested to seal such joints with pipe clamps.

The present improvements have for their chief object the provision of a simple, low-cost, easily-applied and peculiarly efficient sealing device for the kind of welded pipe joints herein described, whereby great savings are effected. Other objects and advantages will appear hereinafter.

In the drawings Figure 1 is an edge view of a device embodying the present invention in a highly advantageous form and as applied for use upon pipe sections.

Figure 2 is a sectional view through one of the pipes as on the line 2—2 of Fig. 1 showing my novel pipe clamp in full side view;

Fig. 3 is a fragmentary enlarged vertical section through the clamp and the pipe sections;

Fig. 4 is a fragmentary enlarged inner face view of either one of the clamping or compression members;

Fig. 5 is a fragmentary perspective view of a sheath for the gasket;

Fig. 6 is a cross-sectional view of the form of gasket shown in Fig. 3; and

Fig. 7 is a similar view of a modified form of gasket.

Referring to Fig. 1 the cylindrical wrought iron or steel pipe sections 10 and 11 are usually welded end to end in the manner illustrated, wherein the abutting edge portions are tapered away somewhat to form an annular cavity occupied by the welding material 12 having a bead-like annular enlargement marked 12a. In order to keep the welding metal from escaping inwardly at the joint it is usual to provide a ring-like sheet metal dam or stop 13 overlapping the joint interiorly and which becomes welded in position also. The triangular gasket 14, shown also in Fig. 6, has a longitudinal-recess 15 at about the middle of its base adapted to accommodate this annular bulge or bead 12a at the joint.

One of the features making for unusual simplicity in the preferred embodiment shown is that the two ring-like compression or clamping members marked as a whole A and B are identical, and a single pattern suffices for both. They are suitably made of malleable cast iron.

A second notable feature is that when assembled as in Fig. 1 the device as a whole is peculiarly narrow, and it extends outwardly from the pipe but a comparatively small distance also, so that the device as a whole occupies but little space, which is always of advantage and in some applications is a feature of special importance.

Each ring-like member A and B is shown in the form of half rings, with bolts 15 (Fig. 2) extending through outwardly-extending lugs 15a of member A to hold its half rings together, and with bolts 16 passing through similar lugs 16b of member B to hold its half rings together. It is old thus to clamp half rings of pipe clamp members together, the purpose being to permit the rings to be applied to the pipe.

Referring to Fig. 3, each member A and B is shown as having a flange-like part 17 having square bolt holes 18 whereby either half ring will accommodate the squared shank 19a of carriage bolt 19. There are six such bolt holes 18 equally spaced apart at the margin of each ring.

Each half ring also has an inner annular portion 9 provided with a truncated-cone-shaped surface 20 (Figs. 3 and 4), these surfaces flaring outwardly and toward the opposite ring whereby a substantially V-shaped recess is formed between the two rings adapted to accomodate the V-shaped gasket 14. This inner part of each member A and B has numerous finger-like projections 21 equally spaced apart, and those on one member as A are directed toward and enter the intervening spaces between the projections 21 on the other member as B, and thus the two members A and B may move toward and away from each other telescopically at these projections.

The conical surface at 20 extends at 20a on the inner sides of the projections 21, and through the telescopic arrangement of these parts the cavity or recess for the gasket is maintained substantially closed, and the gasket is maintained against extrusion at its apical portions. In other words, this telescopic arrangement of the projections 21 permits the two members to be moved toward each other to compress the gasket while maintaining the gasket housed in and restrained against extrusion at all of the various stages of the movement of the members toward each other.

This principle of the invention can be used with other forms of gaskets and with other forms of compression devices. It considers that when a gasket is to be compressed so as to seal a leak it must be held against expansion in other directions so that the pressure will be communicated strongly to the surfaces where the leak occurs; and in a device of this novel character the provision of a telescopic association of the two members permits the cavity or recess for the gasket to be reduced in cross area while remaining a substantially closed recess or channel through interfitting and slidable elements which in part define the cavity or recess for the gasket.

The bolt holes 18 (Fig. 4) and the projections 21 are so arranged with respect to each other that any bolt hole 18 on one member may be positioned opposite any bolt hole 18 of the other member with the projections 21 interfitting and interlocking. In Fig. 2 it will be noted that the bolts 15 and 16 are staggered with respect to each other. According to the construction shown they could be directly opposite each other or variously otherwise staggered. This is an advantage in assembling the device on the pipe, and renders it unnecessary to bolt the parts together in some one particular arrangement, thus expediting the installation.

Referring to Figs. 3 and 5, I have shown an annular shield, protective covering or sheath of relatively unyielding material, such as sheet brass, marked 23. It is rolled to V-shaped form so as to fit snugly upon the gasket 14. This sheath 23 normally overlies that part of the gasket which is covered to a considerable extent by the finger-like projections 21. It prevents extrusion of the gasket at the small openings around the projections 21. It also provides a firm sliding surface for the projections and other parts of the members A and B relative to the gasket. As another important matter, it protects the gasket from the deleterious effects of air and other elements. It provides that when the device is in use the gasket is quite thoroughly housed in and protected from extraneous deteriorating influences, and thus its life is increased when the gasket is of such deteriorating material as rubber compound and the like.

In Fig. 3 this shield 23 may be considered a part of the gasket itself, to such effect that claims hereof specifying a gasket may be considered to have such a protecting element as 23 or to be without such an element, the element 23 being rather a valuable feature for improved efficiency and advantage, rather than one necessary to a practical embodiment of the invention.

In Fig. 7 I have shown a gasket which may be substituted for the one of Fig. 3 or the one of Fig. 6, and in which the main body 26 may be considered to be of rubber compound vulcanized to the proper degree for good sealing effects, while the apical and other upper portions 27 and the edge portions at 27a may be considered vulcanized to a harder degree to provide at 27 such advantages as I have pointed out with respect to the shield or protector 23, and to prevent extrusion and afford protection at the slightly exposed portions 27a. The part 9 preferably turns inward at 9a permitting more body to the gasket along its edges.

In assembling the device for use the four half rings will be assembled on the pipe by the bolts 15 and 16 (Fig. 2) to form two complete rings, with the interlocking and telescopic projections 21 on the opposed members directed in general toward each other. The gasket of Fig. 6 or Fig. 7 is then applied, with the longitudinal recess 15 thereof fitting over the rib-like annular projection 12a of the weld. If the annular shield 23 is to be used that will be applied over the gasket, and then the two members A and B are moved toward each other and the bolts 19 are then applied and drawn taut until the compression is sufficient to seal the weld.

The sealing is effected with unusual thoroughness owing to the fact that the gasket is compressed very tightly along the surface of the pipe sections at both sides of the weld and upon the weld itself.

The device is not only held by the compression of the gasket upon the pipe sections but also by the interlock between the rib-like weld 12a and the gasket at its recess 15. In some applications this interlocking feature would be of particular value. The recess as 15 is of advantage also in permitting the gasket to fit upon the pipe sections adjacent to the weld without undue distortion of the gasket.

The gasket will be ordinarily made in lengths according to vulcanizing and other processes well understood, and will be cut to length to provide a ring-like gasket that will fully occupy the recess for it between the pipe sections and the compression members.

While I have thus illustrated and described what I consider to be the best mode of carrying the invention into effect, it will be evident to those skilled in the art that variations and departures may be made from the specific form and construction of the device shown without departing from the invention, and I therefore contemplate as being included in these improvements all such variations, changes and departures from what is thus illustrated and described as fall within the liberally-construed scope of the appended claims.

I claim:

1. A pipe clamp of the character described for an annular welded joint between pipe sections comprising a pair of ring-like members adapted to encompass the pipe loosely for movement toward each other and being in close face-to-face relation on opposite sides of the pipe joint, said members having telescoping elements having inner surfaces coacting with other surfaces of the members to provide a substantially closed annular cavity when the device is normally positioned on the pipe, an annular sealing gasket filling said cavity, and means for forcing said members toward each other with telescopic action of said elements to compress the gasket.

2. The clamp of claim 1 hereof in which there is an annular band of relatively unyielding material between the gasket and the compression members.

3. The clamp of claim 1 hereof in which said annular cavity and said gasket are substantially V-shaped in cross-section, and there is an annular sheath substantially V-shaped in cross-section between the gasket and said members.

4. A pipe clamp of the character described for an annular welded joint between pipe sections comprising a pair of ring-like members adapted to encompass the pipe loosely for movement and in close face-to-face relation on opposite sides of the pipe joint, an annular sealing gasket substantially V-shaped in cross section fitting tightly between said members and adapted to encompass circumferentially the pipe joint, each of said members having a substantially conical surface flaring outwardly toward the other member and overlying annular portions of the gasket, said members having telescopically interfitting projections which in part carry said conical surfaces, and means for forcing said members toward each other to compress the gasket.

5. A compression member for a pipe sealing device comprising a ring-like member made in several parts to permit its application to the pipe to surround the same, said member having a plurality of projections extending in the longitudinal direction of the pipe when the member is normally applied thereto and providing spaces between the projections to receive coacting projections on a coacting device, said member having inner walls defining a seat for an annular gasket, said projections having some of said inner walls.

6. A pipe clamp of the character described comprising two identical rings in facing relation to each other and having their meeting edge portions respectively formed with interfitting projections and recesses providing for the telescopic movement of the rings in directions toward and away from each other while remaining in facing relation with each other, said rings, including said projections, being formed with inner surfaces providing an annular seat for a gasket, with means for forcing the rings toward each other.

7. A pipe clamp comprising two ring-like members adapted to fit loosely upon pipe sections for movement toward each other on opposite sides of an annular joint between the sections, said members having respectively a substantially large number of projecting extensions, providing a telescopic joint between said members, and the members being formed to provide an annular substantially closed recess for a gasket normally extending on both sides of such joint, a gasket tightly in said recess, said telescopic relation providing that when the members are moved toward each other to compress the gasket said recess is maintained substantially closed against extrusion of the gasket at said telescopic joint, and means for forcing the members toward each other.

FREDERICK R. McMURRAY.